(12) United States Patent
Chiang et al.

(10) Patent No.: US 10,152,038 B2
(45) Date of Patent: Dec. 11, 2018

(54) CONTROL SYSTEM AND CONTROL METHOD FOR ELECTRICALLY OPERATED DEVICE

(71) Applicant: DELTA ELECTRONICS, INC., Taoyuan (TW)

(72) Inventors: Kuo-Yao Chiang, Taoyuan (TW); Shih-Chung Wang, Taoyuan (TW); Yung-Wei Peng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 382 days.

(21) Appl. No.: 15/005,269

(22) Filed: Jan. 25, 2016

(65) Prior Publication Data

US 2016/0338890 A1 Nov. 24, 2016

(30) Foreign Application Priority Data

May 22, 2015 (TW) .............................. 104116397 A

(51) Int. Cl.
| | |
|---|---|
| *G05B 15/02* | (2006.01) |
| *G08C 23/04* | (2006.01) |
| *A47C 20/04* | (2006.01) |
| *H02J 9/06* | (2006.01) |

(52) U.S. Cl.
CPC ............ *G05B 15/02* (2013.01); *A47C 20/041* (2013.01); *G08C 23/04* (2013.01); *H02J 9/06* (2013.01)

(58) Field of Classification Search
None
See application file for complete search history.

(56) References Cited

U.S. PATENT DOCUMENTS

| | | | | |
|---|---|---|---|---|
| 2009/0150100 A1* | 6/2009 | Pifer | ........................ | H02J 9/06 702/62 |
| 2013/0018522 A1* | 1/2013 | Nuhfer | ............... | H05B 33/0815 700/297 |
| 2013/0289770 A1* | 10/2013 | Rawls-Meehan | ...... | G05B 15/02 700/275 |

* cited by examiner

*Primary Examiner* — Mohammad Ali
*Assistant Examiner* — Saad M Kabir
(74) *Attorney, Agent, or Firm* — Kirton McConkie; Evan R. Witt

(57) ABSTRACT

A control system is provided for controlling an electrically operated device. The control system includes a first control box and a second control box. The first control box is equipped with a single button. In case that an input power is normally received and the button is pressed, a pairing process is performed. In case that the input power is interrupted, the second control box is in an emergency mode.

17 Claims, 5 Drawing Sheets

CONTROL SYSTEM AND CONTROL METHOD FOR ELECTRICALLY OPERATED DEVICE

FIELD OF THE INVENTION

The present invention relates to a control system and a control method, and more particularly to a control system and a control method for an electrically operated device.

BACKGROUND OF THE INVENTION

With the increasing development of the science and technology, electrically operated devices are gradually used to replace the manually operated devices. Consequently, the labor cost is reduced.

For example, an electric bed is one of the widely-used electrically operated devices. Since the angle of a bed board of the electric bed is adjustable, the bed board can be adjusted to fit the user's posture so as to provide preferred support to the user's body.

Conventionally, the electric bed is controlled by a control system. By receiving an input power from a power source (e.g., a utility power source), the control system can be normally operated. The control system comprises a first control box, a second control box and an actuator. The second control box and the actuator are electrically connected with each other, and located under the electric bed. The tilt angle of the bed board of the electric bed is adjustable through the actuator. The second control box is used for controlling the actuator. Moreover, after the second control box is paired with a remote controller, the second control box can be remotely controlled by the remote controller and thus the operation of the electric bed can be correspondingly controlled. Since the second control box is disposed under the electric bed, it is difficult to operate the second control box. The first control box is located at a position that is easily operated by the user. For example, the first control box is located at a top side of the electric bed. Moreover, the first control box is electrically connected with the second control box. When the first control box is operated by the user, the second control box is correspondingly controlled. Moreover, the first control box comprises a pairing button, a paring indicator, an emergency button and a power indicator. When the first control box receives the input power, the power status is correspondingly indicated by the power indicator. For operating the electric bed, the user may press the pairing button of the first control box to have the first control box issue a pairing signal to the second control box. After the pairing signal is received, the second control box performs a pairing process. During the pairing process, the pairing status is correspondingly indicated by the paring indicator. After a paring button of the remote controller is pressed, the pairing between the remote controller and the second control box is successfully performed. In case that the input power is interrupted and the emergency button is pressed, the control system is in an emergency mode. In the emergency mode, a backup power is transmitted from the first control box to the second control box. Consequently, the actuator of the electric bed is correspondingly controlled to continuously lower the tilt angle of the bed board until the bed board is flat.

However, the conventional control system still has some drawbacks. For example, it is necessary to install both of the pairing button and the emergency button on the first control box. By pressing the pairing button, the second control box is in the pairing mode. By pressing the emergency button, the second control box is in the emergency mode. The arrangement of both of the pairing button and the emergency button increases the cost of the control system. Moreover, it is necessary to install both of the power indicator and the pairing indicator on the first control box. The power status of the first control box is indicated by the power indicator. The paring situation of the second control box is indicated by the pairing indicator. Similarly, the arrangement of both of the power indicator and the pairing indicator increases the cost of the control system.

Therefore, there is a need of provides a control system and a control method for an electrically operated device in order to overcome the above drawbacks.

SUMMARY OF THE INVENTION

An object of the present invention provides a control system and a control method for an electrically operated device. A single button is installed on the first control box of the control system. In case that an input power is normally received, a second control box is in a pairing mode. In case that the input power is normally received and the button is pressed, the second control box performs a pairing process. In case that the input power is interrupted and the button is pressed, the second control box is in an emergency mode. When compared with the first control box of the conventional control system with the pairing button and the emergency button, the control system of the present invention is more cost-effective.

Another object of the present invention provides a control system and a control method for an electrically operated device. A single indicator is installed on the first control box of the control system. In case that the input power is normally received, the indicator is in a first indication state to indicate the power status. During the pairing process, the indicator is in a second indication state to indicate the pairing state. After the pairing between a second control box and a remote controller is completed, the indicator is in a third indication state to indicate the successful pairing. When compared with the first control box of the conventional control system with the power indicator and the pairing indicator, the control system of the present invention is more cost-effective.

In accordance with an aspect of the present invention, there is provided a control system for controlling an electrically operated device. The control system includes a first control box and a second control box. The first control box includes a first transmission terminal, a second transmission terminal, an electric storage device, a controllable switching unit and a path selection circuit. The electric storage device stores a backup power. The controllable switching unit is selectively turned on or turned off and electrically connected with the second transmission terminal. The path selection circuit is configured to receive an input power and electrically connected with the first transmission terminal, the controllable switching unit and the electric storage device. When the input power is available, the input power is transmitted to the first transmission terminal and the controllable switching unit through the path selection circuit. When the input power is not available, the backup power is transmitted to the controllable switching unit through the path selection circuit. The second control box is controlled by the first control box to control the electrically operated device accordingly. The second control box includes a main controlling unit electrically connected with the first transmission terminal and the second transmission terminal. When the input power is available, the main controlling unit receives the input power through the first transmission terminal and the second control box is operated in a pairing mode. When the second control box is operated in the pairing mode and the controllable switching unit is turned on, the input power is transmitted to the main controlling unit through the controllable switching unit and the second transmission terminal, and the main controlling unit performs a pairing process. When the input power is not available and the controllable switching unit is turned on, the backup power is transmitted to the main controlling unit through the controllable switching unit and the second transmission terminal, and the second control box is operated in an emergency mode.

In accordance with another aspect of the present invention, there is provided a control method for controlling an electrically operated device by a control system. The control system comprises a first control box and a second control box. The first control box comprises a first transmission terminal, a second transmission terminal, an electric storage device, a controllable switching unit and a path selection circuit. The controllable switching unit is electrically connected with the second transmission terminal, and the path selection circuit is electrically connected with the first transmission terminal, the controllable switching unit and the electric storage device. The second control box is controlled by the first control box, and the electrically operated device is correspondingly controlled by the second control box. The second control box comprises a main controlling unit electrically connected with the first transmission terminal and the second transmission terminal. The control method comprising the following steps. Firstly, determine whether an input power is normally received by the path selection circuit. When the input power is normally received by the path selection circuit, the control system performs the following steps of: transmitting the input power to the main controlling unit through the path selection circuit and the first transmission terminal; allowing the main controlling unit to be operated in a pairing mode according to the input power from the first transmission terminal; and when the controllable switching unit is turned on, the input power is transmitted to the main controlling unit through the path selection circuit, the controllable switching unit and the second transmission terminal, so that the main controlling unit performs a pairing process. When the input power is interrupted, the control system performs the following steps of: when the controllable switching unit is turned on, a backup power of the electric storage device is transmitted to the main controlling unit through the path selection circuit, the controllable switching unit and the second transmission terminal; and allowing the main controlling unit to be operated in an emergency mode according to the backup power from the second transmission terminal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
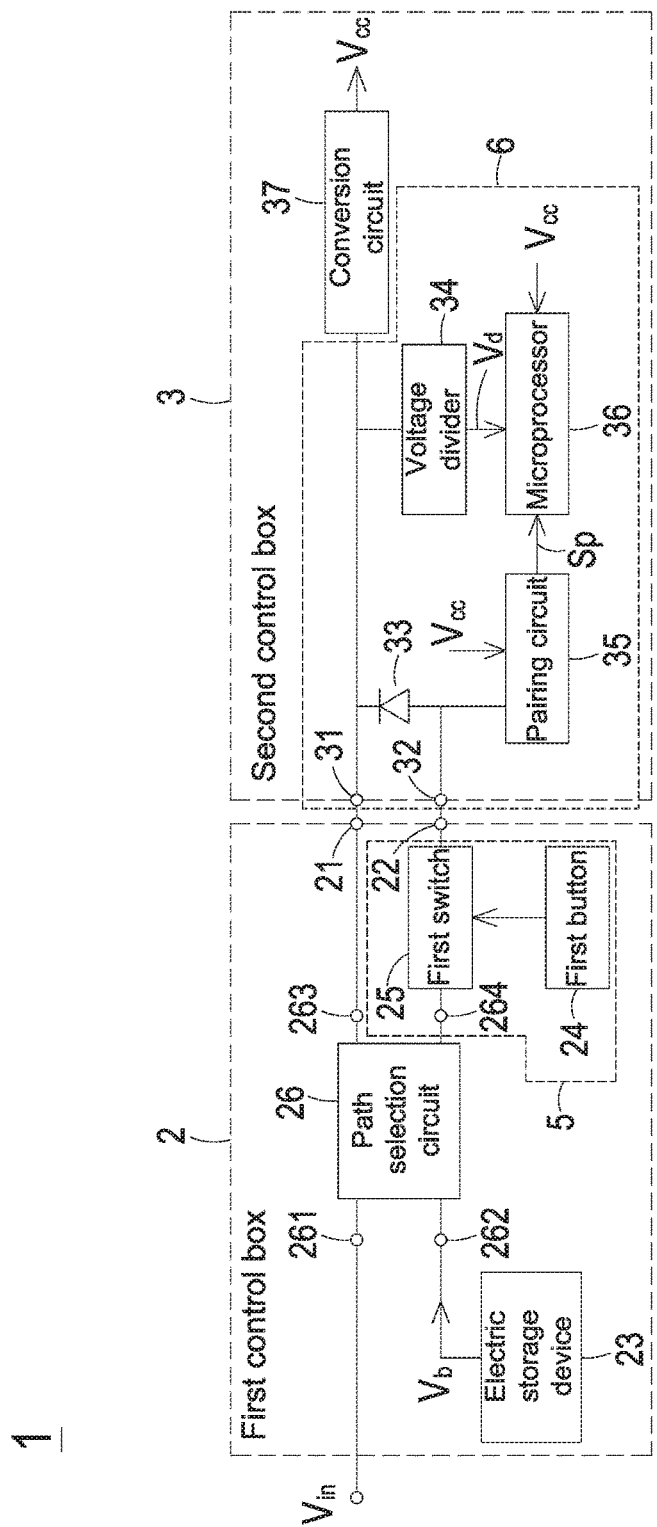
FIG. 1 is a schematic circuit diagram illustrating a control system according to an embodiment of the present invention.

FIG. 1 is a schematic circuit diagram illustrating a control system according to an embodiment of the present invention. The control system 1 is applied to an electrically operated device. An example of the electrically operated device includes and is not limited to an electric bed. Hereinafter, the present invention will be illustrated by referring the electric bed as the electrically operated device. As shown in FIG. 1, the control system 1 comprises a first control box 2 and a second control box 3. The first control box 2 may receive an input power $V_{in}$. Moreover, the first control box 2 is electrically connected with the second control box 3 in order to control the second control box 3 to be operated in a pairing mode or an emergency mode.

The first control box 2 comprises a first transmission terminal 21, a second transmission terminal 22, an electric storage device 23, a controllable switching unit 5 and a path selection circuit 26. An example of the electric storage device 23 includes and is not limited to a battery. The electric storage device 23 is used for storing a backup power $V_b$. The controllable switching unit 5 is selectively turned on or turned off. In this embodiment, the controllable switching unit 5 comprises a first button 24 and a first switch 25. The first button 24 can be pressed by the user. A control terminal of the first switch 25 is electrically connected with the first button 24. An output terminal of the first switch 25 is electrically connected with the second transmission terminal 22. According to the result of determining whether the first button 24 is pressed, the first switch 25 is selectively turned on or turned off. For example, if the first button 24 is pressed by the user, the first switch 25 is turned on. Whereas, if the first button 24 is not pressed by the user, the first switch 25 is turned off.

The path selection circuit 26 has a first input terminal 261, a second input terminal 262, a first output terminal 263 and a second output terminal 264. The first input terminal 261 receives the input power $V_{in}$. The first output terminal 263 is electrically connected with the first transmission terminal 21. The second input terminal 262 is electrically connected with the electric storage device 23 in order to receive a backup power $V_b$ form the electric storage device 23. The second output terminal 264 is electrically connected with an input terminal of the first switch 25. In case that the input power $V_{in}$ is available or is normally received by the path selection circuit 26, the received input power $V_{in}$ is transmitted to the first output terminal 263 and the second output terminal 264 through the path selection circuit 26. In case that the input power $V_{in}$ is interrupted, not available, or not received by the path selection circuit 26, and the backup power $V_b$ from the electric storage device 23 is received by the path selection circuit 26, the received backup power $V_b$ is transmitted to the second output terminal 264 through path selection circuit 26. Moreover, in case that the first switch 25 is turned on and the received input power $V_{in}$ is transmitted to the second output terminal 264 through the path selection circuit 26, the received input power $V_{in}$ is transmitted to the second transmission terminal 22 through the first switch 25. In case that the first switch 25 is turned on and the received backup power $V_b$ from the path selection circuit 26 is transmitted to the second output terminal 264, the received backup power $V_b$ is transmitted to the second transmission terminal 22 through the first switch 25.

The second control box 3 is controlled by the first control box 2, so that the operation of the electric bed is correspondingly controlled. The first control box 2 can control the second control box 3 by selectively outputting the input power $V_{in}$ or the backup power $V_b$. In this embodiment, the second control box 3 comprises a main controlling unit 6. The main controlling unit 6 is electrically connected with the first transmission terminal 21 and the second transmission terminal 22 of the first control box 2. In case that the input power $V_{in}$ is available and normally received by the first control box 2, the input power $V_{in}$ from the first transmission terminal 21 is received by the main controlling unit 6, so that the second control box 3 is operated in the pairing mode. In case that the second control box 3 is operated in the pairing mode and the first switch 25 is turned on, the input power $V_{in}$ from the second transmission terminal 22 is also received by the main controlling unit 6. Under this circumstance, the main controlling unit 6 performs a pairing process. On the other hand, in case that the input power $V_{in}$ is interrupted or not available, and the first switch 25 is turned on, the backup power $V_b$ from the second transmission terminal 22 is received by the main controlling unit 6, and the second control box 3 is operated in the emergency mode.

The main controlling unit 6 comprises a first receiving terminal 31, a second receiving terminal 32, a first diode 33, a voltage divider 34, a pairing circuit 35 and a microprocessor 36. The first receiving terminal 31 is electrically connected with the first transmission terminal 21 of the first control box 2. The second receiving terminal 32 is electrically connected with the second transmission terminal 22 of the first control box 2.

The anode of the first diode 33 is electrically connected with the second receiving terminal 32. The cathode of the first diode 33 is electrically connected with the first receiving terminal 31. In case that the input power $V_{in}$ is interrupted or not available, and the first switch 25 is turned on by pressing the first button 24, the backup power $V_b$ is transmitted to the first receiving terminal 31 through the path selection circuit 26, the on-state first switch 25, the second transmission terminal 22, the second receiving terminal 32 and the first diode 33.

A first terminal of the voltage divider 34 electrically connected with the first receiving terminal 31 and the cathode of the first diode 33. In case that the input power $V_{in}$ is transmitted to the first receiving terminal 31 through the path selection circuit 26 and the first transmission terminal 21, the input power $V_{in}$ is received by the voltage divider 34 and subjected to a voltage division. Consequently, a divided voltage $V_d$ with a first voltage level is generated by the voltage divider 34. In case that the input power $V_{in}$ is interrupted or not available, and the first switch 25 is turned on by pressing the first button 24, the backup power $V_b$ from the electric storage device 23 is received by the voltage divider 34 through the first receiving terminal 31 and subjected to a voltage division. Consequently, a divided voltage $V_d$ with a second voltage level is generated by the voltage divider 34.

A first terminal of the pairing circuit 35 is electrically connected with the second receiving terminal 32 of the second control box 3. In case that the input power $V_{in}$ is normally received and the first switch 25 is turned on by pressing the first button 24, the input power $V_{in}$ is transmitted to the pairing circuit 35 through the path selection circuit 26, the first switch 25, the second transmission terminal 22 and the second receiving terminal 32. Consequently, the pairing circuit 35 generates a pairing signal Sp.

The microprocessor 36 is electrically connected with a second terminal of the voltage divider 34 and a second terminal of the pairing circuit 35. In the paring mode, the divided voltage $V_d$ with the first voltage level is transmitted from the voltage divider 34 to the microprocessor 36. Consequently, the microprocessor 36 detects whether the pairing signal Sp is received. If the pairing signal Sp is received by the microprocessor 36 in the pairing mode, the microprocessor 36 will perform the pairing process. By pressing a pairing button of a remote controller (not shown), the pairing between the remote controller and the microprocessor 36 is established. Whereas, in the emergency mode, the divided voltage $V_d$ with the second voltage level is transmitted from the voltage divider 34 to the microprocessor 36. In the emergency mode, the backup power $V_b$ from the electric storage device 23 is used by the second control box 3. Consequently, the electrically operated device is restored to a default state from the current state. For example, the tilt angle of the bed board of the electric bed is continuously lowered until the bed board is flat.

The operating principles of the control system 1 will be illustrated as follows. In case that the input power $V_{in}$ is available and normally received by the path selection circuit 26 of the first control box 2, the received input power $V_{in}$ is transmitted to the first transmission terminal 21 and the first switch 25 of the first control box 2 through the path selection circuit 26. The input power $V_{in}$ is transmitted to the voltage divider 34 through the first transmission terminal 21 and the first receiving terminal 31 and subjected to a voltage division. Consequently, the divided voltage $V_d$ with the first voltage level is generated by the voltage divider 34. The divided voltage $V_d$ with the first voltage level is transmitted to the microprocessor 36, and the microprocessor 36 is operated in the pairing mode according to the divided voltage $V_d$ with the first voltage level. Then, the microprocessor 36 detects whether the pairing signal Sp from the pairing circuit 35 is received. In the paring mode, if the first button 24 of the first control box 2 is pressed by the user, the first switch 25 is turned on. Consequently, the input power $V_{in}$ is transmitted to the second receiving terminal 32 of the second control box 3 through the path selection circuit 26, the first switch 25 and the second transmission terminal 22. After the input power $V_{in}$ is received by the pairing circuit 35, the pairing circuit 35 generates the pairing signal Sp. In response to the pairing signal Sp, the microprocessor 36 performs the pairing process. By pressing a pairing button of a remote controller (not shown), the pairing between the remote controller and the second control box 3 is established. Consequently, the user can operate the remote controller to have the second control box 3 control the electrically operated device. In case that the input power $V_{in}$ is interrupted and the first button 24 of the first control box 2 is pressed by the user, the first switch 25 is turned on. Consequently, the backup power $V_b$ of the electric storage device 23 is transmitted to the first receiving terminal 31 through the path selection circuit 26, the first switch 25, the second transmission terminal 22, the second receiving terminal 32 and the first diode 33. After the backup power $V_b$ is subjected to a voltage division, the divided voltage $V_d$ with the second voltage level is generated by the voltage divider 34. The divided voltage $V_d$ with the second voltage level is transmitted to the microprocessor 36, and the microprocessor 36 is in the emergency mode. Consequently, the tilt angle of the bed board of the electric bed is continuously lowered until the bed board is flat.

As shown in FIG. 1, the second control box 3 further comprises a conversion circuit 37. The conversion circuit 37 is electrically connected with the first receiving terminal 31 of the second control box 3. Consequently, the input power $V_{in}$ or the backup power $V_b$ from the first receiving terminal 31 is converted into an operation voltage Vcc by the conversion circuit 37. The operation voltage Vcc is provided to the electronic components within the second control box 3. For example, these electronic components include the pairing circuit 35 and the microprocessor 36. In this embodiment, the voltage level of the input power $V_{in}$ is larger than the voltage level of the backup power $V_b$.

From the above descriptions, the first control box 2 of the control system 1 is equipped with a single button (i.e., the first button 24). In case that the input power $V_{in}$ is normally received, the first button 24 is used as a pairing button. In case that the input power $V_{in}$ is normally received and the first button 24 is pressed, the microprocessor 36 of the second control box 3 performs the pairing process. In case that the input power $V_{in}$ is interrupted, the first button 24 is used as an emergency button. In case that the input power $V_{in}$ is interrupted and the first button 24 is pressed, the microprocessor 36 of the second control box 3 is in the emergency mode. In other words, even if the first control box 2 of the control system 1 has the single button, the functions of the pairing mode and the emergency mode can be achieved. When compared with the first control box of the conventional control system with two buttons, the fabricating cost of the control system 1 of the present invention is reduced.

Figure 2:
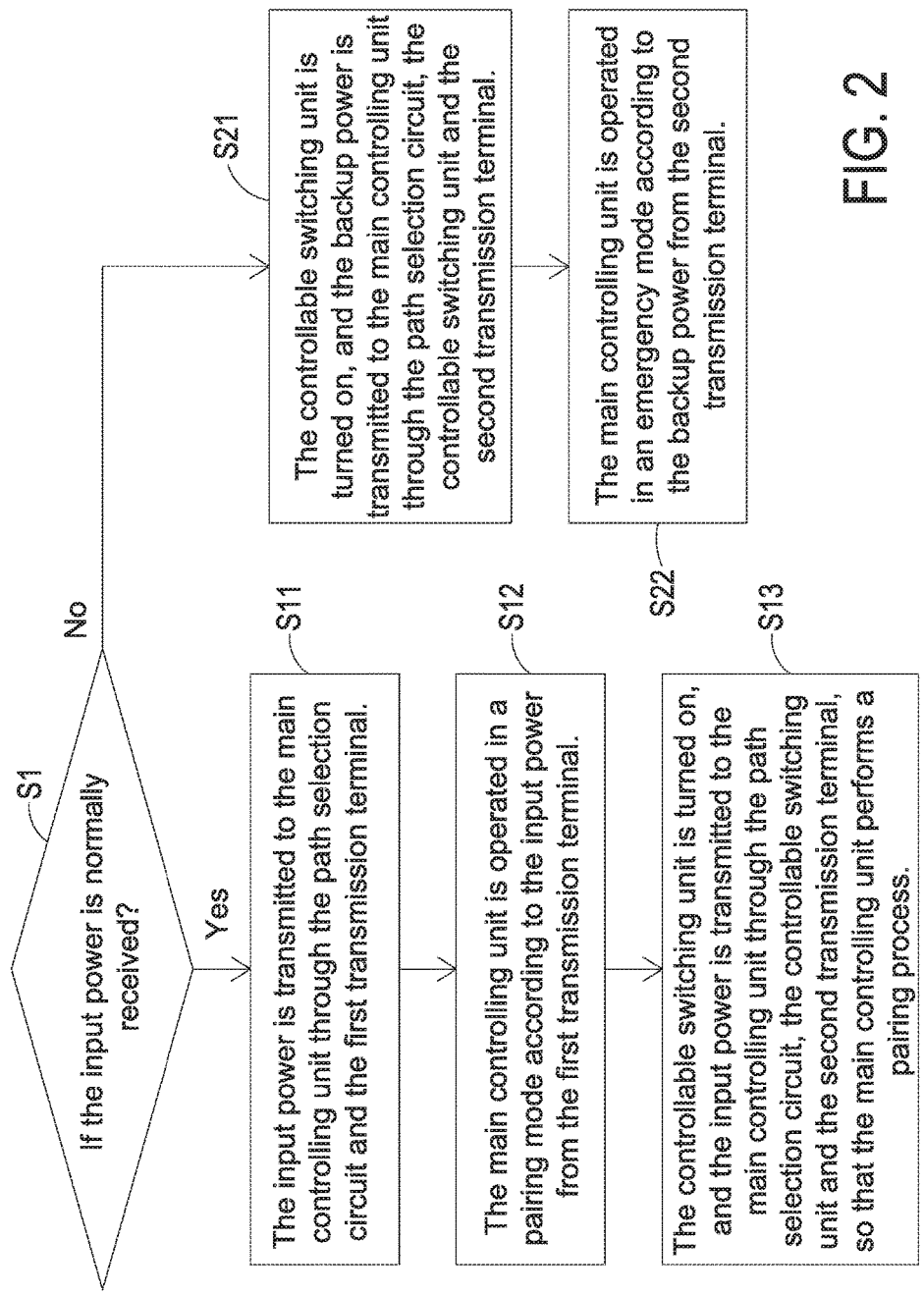
FIG. 2 is a flowchart illustrating a control method for the control system of FIG. 1.

FIG. 2 is a flowchart illustrating a control method for the control system of FIG. 1. Firstly, the step S1 is performed to determine whether the input power $V_{in}$ is normally received or interrupted.

If the input power $V_{in}$ is normally received, the steps S11, S12 and S13 are sequentially performed. In the step S11, the input power $V_{in}$ is transmitted to the main controlling unit 6 through the path selection circuit 26 and the first transmission terminal 21. In the step S12, the main controlling unit 6 is operated in a pairing mode according to the input power $V_{in}$ from the first transmission terminal 21. In the step S13, the controllable switching unit 5 is turned on. Consequently, the input power $V_{in}$ is transmitted to the main controlling unit 6 through the path selection circuit 26, the controllable switching unit 5 and the second transmission terminal 22. Meanwhile, the main controlling unit 6 performs a pairing process. By pressing a pairing button of a remote controller (not shown), the pairing between the remote controller and the microprocessor 36 of the second control box 3 is established.

Whereas, if the input power $V_{in}$ is interrupted, the steps S21 and S22 are sequentially performed. In the step S21, the controllable switching unit 5 is turned on. Consequently, the backup power $V_b$ of the electric storage device 23 is transmitted to the main controlling unit 6 through the path selection circuit 26, the controllable switching unit 5 and the second transmission terminal 22. In the step S22, the main controlling unit 6 is in an emergency mode according to the backup power $V_b$ from the second transmission terminal 22. Consequently, the tilt angle of the bed board of the electric bed is continuously lowered until the bed board is flat.

Figure 3:
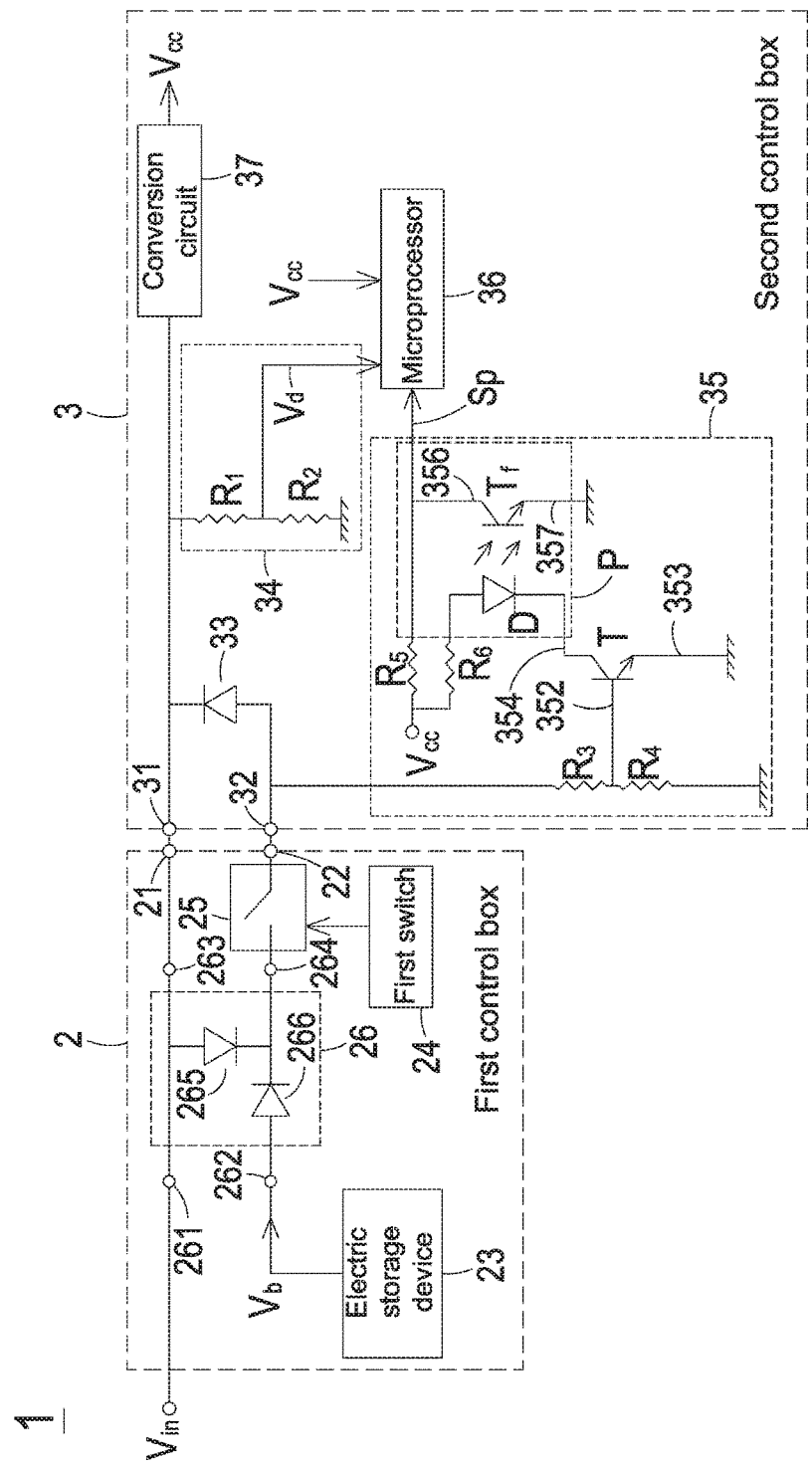
FIG. 3 is a schematic circuit diagram illustrating the detailed circuitry of the control system of FIG. 1.

FIG. 3 is a schematic circuit diagram illustrating the detailed circuitry of the control system of FIG. 1. In this embodiment, the path selection circuit 26 of the first control box 2 comprises a second diode 265 and a third diode 266. The anode of the second diode 265 is electrically connected with the first input terminal 261 in order to receive the input power $V_{in}$. The cathode of the second diode 265 is electrically connected with an input terminal of the first switch 25. The anode of the third diode 266 is electrically connected with the second input terminal 262, and connected with the electric storage device 23 through the second input terminal 262 in order for receiving the backup power $V_b$. The cathode of the third diode 266 is electrically connected with the input terminal of the first switch 25 and the cathode of the second diode 265. In case that the input power $V_{in}$ is normally received, the input power $V_{in}$ is transmitted to the first transmission terminal 21 through the path selection circuit 26. Moreover, since the voltage level of the input power $V_{in}$ is larger than the voltage level of the backup power $V_b$, the second diode 265 is forward biased, and the input power $V_{in}$ is transmitted to the second output terminal 264. Moreover, in case that the input power $V_{in}$ is interrupted, the third diode 266 is forward biased, and the backup power $V_b$ is transmitted to the second output terminal 264.

The voltage divider 34 of the third control box 3 comprises a first divider resistor $R_1$ and a second divider resistor $R_2$. A first terminal of the first divider resistor $R_1$ is electrically connected with the first receiving terminal 31 of the second control box 3 and the cathode of the first diode 33. A first terminal of the second divider resistor $R_2$ is electrically connected with a second terminal of the first divider resistor $R_1$ and the microprocessor 36. A second terminal of the second divider resistor $R_2$ is electrically connected with a ground terminal.

The pairing circuit 35 comprises a third divider resistor $R_3$, a fourth divider resistor $R_4$, a first transistor T, a first resistor $R_5$, a second resistor $R_6$ and an optical coupler P. A first terminal of the third divider resistor $R_3$ is electrically connected with the second receiving terminal 32 of the second control box 3. A first terminal of the fourth divider resistor $R_4$ is electrically connected with a second terminal of the third divider resistor $R_3$. A second terminal of the fourth divider resistor $R_4$ is electrically connected with the ground terminal. A first control terminal (e.g., a base) 352 of the first transistor T is electrically connected with the second terminal of the third divider resistor $R_3$ and the first terminal of the fourth divider resistor $R_4$. A first current output terminal (e.g., an emitter) 353 of the first transistor T is electrically connected with the ground terminal. A first terminal of the first resistor $R_5$ and a first terminal of the second resistor $R_6$ receive the operation voltage Vcc. A second terminal of the first resistor $R_5$ is electrically connected with the microprocessor 36. The optical coupler P comprises a coupler diode D and a coupler transistor $T_f$. A cathode of the coupler diode D is electrically connected with a first current input terminal (e.g., a collector) 354 of the first transistor T. An anode of the coupler diode D is electrically connected with a second terminal of the second resistor $R_6$. A current input terminal 356 of the coupler transistor $T_f$ is electrically connected with the second terminal of the first resistor $R_5$ and the microprocessor 36. A current output terminal 357 of the coupler transistor $T_f$ is electrically connected with the ground terminal. In case that the input power $V_{in}$ is normally received and the first button 24 of the first control box 2 is pressed to turn on the first switch 25, the input power $V_{in}$ from the second receiving terminal 32 is subjected to a voltage division by the third divider resistor $R_3$ and the fourth divider resistor $R_4$. Consequently, the first transistor T is turned on in response to the divided voltage. Meanwhile, the operation voltage Vcc is transmitted to the coupler diode D through the second resistor $R_6$ so as to turn on the coupler transistor $T_f$. Since the current output terminal 357 of the coupler transistor $T_f$ is electrically connected with the ground terminal, the voltage at the current input terminal 356 of the coupler transistor $T_f$ is pulled down. Meanwhile, a pairing signal Sp with a low voltage level is transmitted from the current input terminal 356 of the coupler transistor $T_f$ to the microprocessor 36. Consequently, the microprocessor 36 performs the pairing process.

Figure 4:
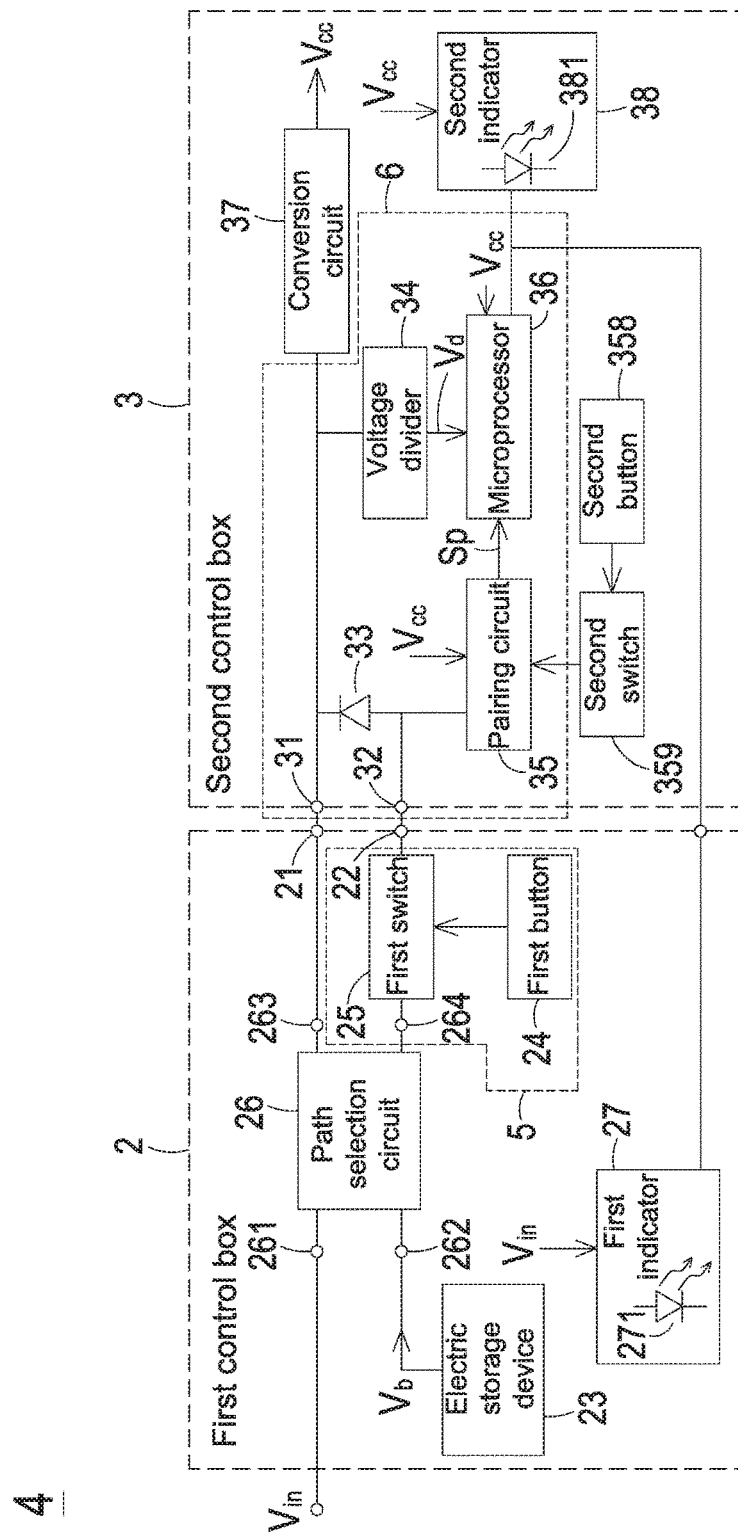
FIG. 4 is a schematic circuit diagram illustrating a control system according to another embodiment of the present invention.

FIG. 4 is a schematic circuit diagram illustrating a control system according to another embodiment of the present invention. Component parts and elements corresponding to those of FIG. 1 are designated by identical numeral references, and detailed descriptions thereof are omitted. In comparison with the control system 1, the first control box 2 of the control system 4 of this embodiment further comprises a first indicator 27 with a first light emitting diode 271, and the second control box 3 further comprises a second indicator 38 with a second light emitting diode 381. The first indicator 27 is electrically connected with the microprocessor 36 of the second control box 3. The first indicator 27 is operated according to the signal from the microprocessor 36 and the input power $V_{in}$. The second indicator 38 is electrically connected with the microprocessor 36 and the first indicator 27. The second indicator 38 is operated according to the signal from the microprocessor 36 and the operation voltage Vcc from the conversion circuit 37. When the divided voltage $V_d$ with the first voltage level is transmitted from the voltage divider 34 to the microprocessor 36 and the microprocessor 36 is in the pairing mode, a low level signal is transmitted from the microprocessor 36 to the first indicator 27 and the second indicator 38. Consequently, the first indicator 27 and the second indicator 38 are in a first indication state. For example, in the first indication state, the first indicator 27 and the second indicator 38 continuously emit light beams. The first indicator 27 in the first indication state indicates that the input power $V_{in}$ is normally received by the first control box 2.

In case that the pairing signal Sp from the pairing circuit 35 is received by the microprocessor 36 in the pairing mode, the microprocessor 36 performs the pairing process and issues a high level signal to the first indicator 27 and the second indicator 38. Consequently, the first indicator 27 and the second indicator 38 are in a second indication state. For example, in the second indication state, the first indicator 27 and the second indicator 38 do not emit light beams. After the pairing process is completed, the pairing between the remote controller and the second control box 3 is successfully performed. Meanwhile, the microprocessor 36 issues a periodic pulse signal to the first indicator 27 and the second indicator 38. Consequently, the first indicator 27 and the second indicator 38 are in a third indication state. For example, in the third indication state, the first indicator 27 and the second indicator 38 emit flickering light beams. In other words, the pairing situation of the second control box 3 is also indicated by the first indicator 27.

Since the first control box 2 further comprises the first indicator 27 and the second control box 3 further comprises the second indicator 38, the control method of FIG. 2 can be modified. For example, in the step S12, the microprocessor 36 is in the pairing mode according to the divided voltage $V_d$, and a low level signal is transmitted from the microprocessor 36 to the first indicator 27 and the second indicator 38. Consequently, the first indicator 27 and the second indicator 38 are in a first indication state. Moreover, in the step S13, the microprocessor 36 performs the pairing process in response to the pairing signal Sp and the microprocessor 36 performs the pairing process and issues a high level signal to the first indicator 27 and the second indicator 38. Consequently, the first indicator 27 and the second indicator 38 are in a second indication state. Moreover, in the step S13, the pairing process is performed and a pairing button of a remote controller (not shown) is pressed, so that the pairing between the remote controller and the second control box 3 is established. Meanwhile, the microprocessor 36 issues a periodic pulse signal to the first indicator 27 and the second indicator 38. Consequently, the first indicator 27 and the second indicator 38 are in a third indication state.

Moreover, in this embodiment, the second control box 3 further comprises a second button 358 and a second switch 359. Consequently, the second control box 3 can generate a pairing signal Sp to the microprocessor 36 to have the microprocessor 36 perform the pairing process. The second button 358 can be pressed by the user. The second switch 359 is electrically connected between the pairing circuit 35 and the ground terminal (see FIG. 5). According to the result of judging whether the second button 358 is pressed, the second switch 359 is selectively turned on or turned off. For example, in case that the input power $V_{in}$ is normally received, the microprocessor 36 is in the pairing mode. If the second button 358 is pressed by the user, the second switch 359 is turned on. Since the second switch 359 is turned on, the pairing circuit 35 generates the pairing signal Sp. In response to the pairing signal Sp, the microprocessor 36 performs the pairing process. It is noted that the second button 358 and the second switch 359 can be applied to the second control box 3 of the control system 1 of FIG. 1.

Figure 5:
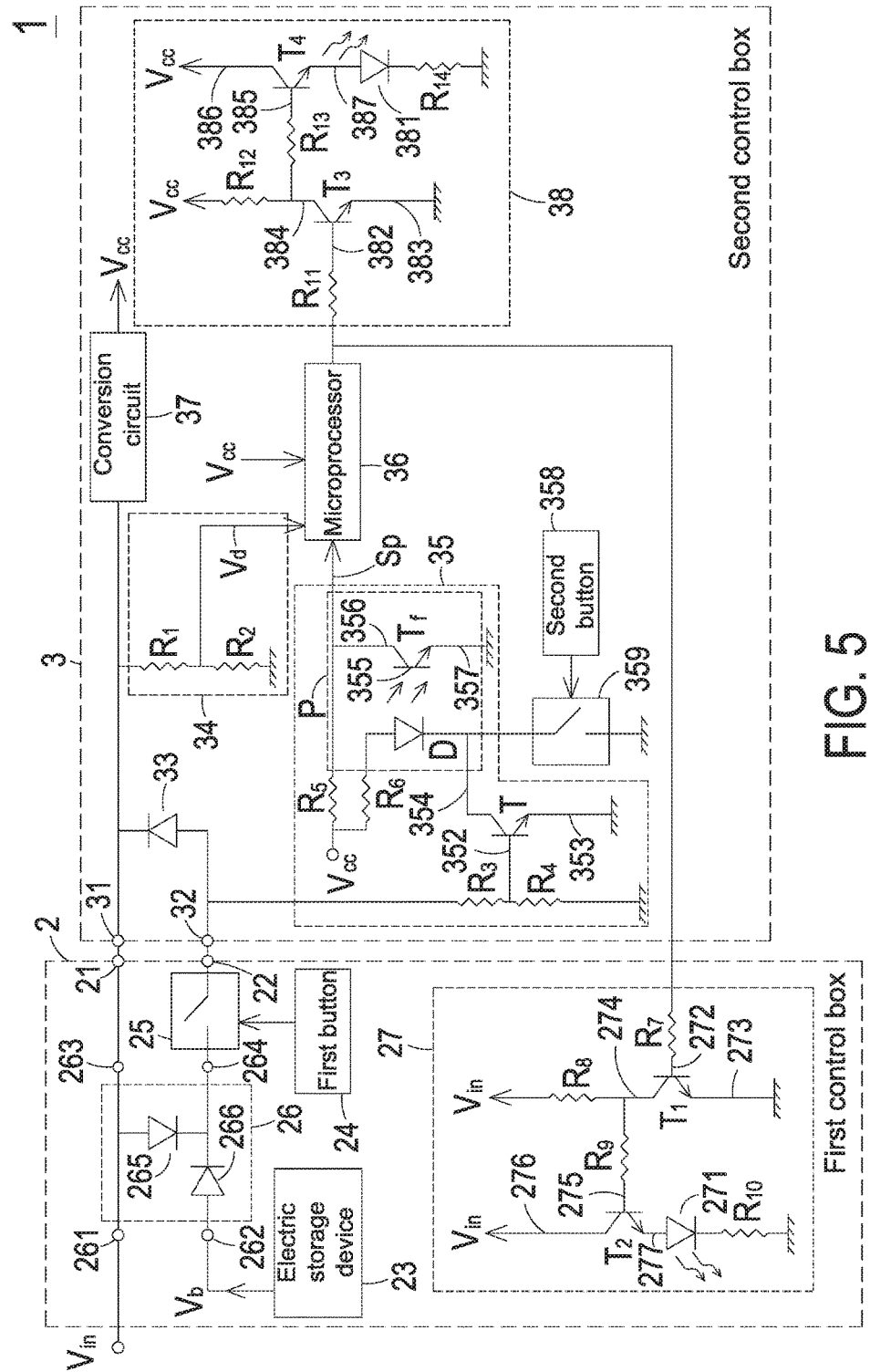
FIG. 5 is a schematic circuit diagram illustrating the detailed circuitry of the control system of FIG. 4.

FIG. 5 is a schematic circuit diagram illustrating the detailed circuitry of the control system of FIG. 4. As shown in FIG. 5, the first indicator 27 comprises a second transistor $T_1$, a third transistor $T_2$, a third resistor $R_7$, a fourth resistor $R_8$, a fifth resistor $R_9$, a sixth resistor $R_{10}$ and the first light emitting diode 271. A first terminal of the third resistor $R_7$ is electrically connected with the microprocessor 36 of the second control box 36. A second control terminal (e.g., a base) 272 of the second transistor $T_1$ is electrically connected with a second terminal of the third resistor $R_7$. A second current output terminal (e.g., an emitter) 273 of the second transistor $T_1$ is electrically connected with the ground terminal. A first terminal of the fourth resistor $R_8$ is electrically connected with a second current input terminal (e.g., a collector) 274 of the second transistor $T_1$. A second terminal of the fourth resistor $R_8$ receives the input power $V_{in}$. A first terminal of the fifth resistor $R_9$ is electrically connected with the first terminal of the fourth resistor $R_8$ and the second current input terminal 274 of the second transistor $T_1$. A third control terminal (e.g., a base) 275 of the third transistor $T_2$ is electrically connected with a second terminal of the fifth resistor $R_9$. A third current input terminal (e.g., a collector) 276 of the third transistor $T_2$ receives the input power $V_{in}$. An anode of the first light emitting diode 271 is electrically connected with a third current output terminal (e.g., an emitter) 277 of the third transistor $T_2$. A first terminal of the sixth resistor $R_{10}$ is electrically connected with a cathode of the first light emitting diode 271. A second terminal of the sixth resistor $R_{10}$ is electrically connected with the ground terminal.

The second indicator 38 comprises a fourth transistor $T_3$, a fifth transistor $T_4$, a seventh resistor $R_{11}$, an eighth resistor $R_{12}$, a ninth resistor $R_{13}$, a tenth resistor $R_{14}$ and the second light emitting diode 381. A first terminal of the seventh resistor $R_{11}$ is electrically connected with the microprocessor 36 and the first terminal of the third resistor $R_7$ of the first indicator 27. A fourth control terminal (e.g., a base) 382 of the fourth transistor $T_3$ is electrically connected with a second terminal of the seventh resistor $R_{11}$. A fourth current output terminal (e.g., an emitter) 383 of the fourth transistor $T_3$ is electrically connected with the ground terminal. A first terminal of the eighth resistor $R_{12}$ is electrically connected with a fourth current input terminal (e.g., a collector) 384 of the fourth transistor $T_3$. A second terminal of the eighth resistor $R_{12}$ receives the operation voltage Vcc. A first terminal of the ninth resistor $R_{13}$ is electrically connected with the first terminal of the eighth resistor $R_{12}$ and the fourth current input terminal 384 of the fourth transistor $T_3$. A fifth control terminal (e.g., a base) 385 of the fifth transistor $T_4$ is electrically connected with a second terminal of the ninth resistor $R_{13}$. A fifth current input terminal (e.g., a collector) 386 of the fifth transistor $T_4$ receives the operation voltage Vcc. An anode of the second light emitting diode 381 is electrically connected with a fifth current output terminal (e.g., an emitter) 377 of the fifth transistor $T_4$. A first terminal of the tenth resistor $R_{14}$ is electrically connected with a cathode of the second light emitting diode 381. A second terminal of the tenth resistor $R_{14}$ is electrically connected with the ground terminal.

In this embodiment, both of the first indicator 27 and the second indicator 38 are electrically connected with the microprocessor 36 so as to receive the same signal from the microprocessor 36. The first indicator 27 and the second indicator 38 have the same circuitry configurations. Preferably but not exclusively, the first indicator 27 and the second indicator 38 are in synchronization with each other.

The operating principles of the first indicator 27 will be illustrated as follows. When the divided voltage $V_d$ with the first voltage level is transmitted from the voltage divider 34 to the microprocessor 36 and the microprocessor 36 is in the pairing mode, the low level signal is transmitted from the microprocessor 36 to the first indicator 27. Meanwhile, the second transistor $T_1$ is turned off. Consequently, the input power $V_{in}$ is transmitted to the third control terminal 275 of the third transistor $T_2$ through the fourth resistor $R_8$ and the fifth resistor $R_9$ so as to turn on the third transistor $T_2$. Meanwhile, the input power $V_{in}$ is transmitted to the first light emitting diode 271 through the third current input terminal 276 and the third current output terminal 277 of the third transistor $T_2$. Consequently, the first indicator 27 is in the first indication state. For example, in the first indication state, the first light emitting diode 271 continuously emits the light beam.

In case that the pairing signal Sp from the pairing circuit 35 is received by the microprocessor 36 in the pairing mode, the microprocessor 36 performs the pairing process and issues the high level signal to the first indicator 27. Since the high level signal is received by the first indicator 27, the second transistor $T_1$ is turned on. Meanwhile, the fifth resistor $R_9$ is connected with the ground terminal through the on-state second transistor $T_1$. Consequently, the third transistor $T_2$ is turned off. Since the input power $V_{in}$ is not received by the first light emitting diode 271, the first indicator 27 is in the second indication state. For example, in the second indication state, the first light emitting diode 271 does not emit the light beam. After the pairing process is completed, the pairing between the remote controller and the second control box is successfully performed. Meanwhile, the microprocessor 36 issues the periodic pulse signal to the first indicator 27. The periodic pulse signal is transmitted to the second control terminal 272 of the second transistor $T_1$ through the third resistor $R_7$. Consequently, the second transistor $T_1$ is alternately turned on or turned off. As mentioned above, the first light emitting diode 271 does not emit the light beam when the second transistor $T_1$ is turned on, and the second transistor $T_1$ is turned off when the first light emitting diode 271 continuously emits the light beam. That is, while the periodic pulse signal is received by the first indicator 27, the first indicator 27 is in a third indication state. For example, in the third indication state, the first light emitting diode 271 emits the flickering light beam.

In this embodiment, the second indicator 38 receives the operation voltage Vcc, and the first indicator 27 receives the input power $V_{in}$. Since the first indicator 27 and the second indicator 38 have the same circuitry configurations and are electrically connected with the microprocessor 36 to receive the same signal from the microprocessor 36, the first indicator 27 and the second indicator 38 are in synchronization with each other. The operations of the second indicator 38 are similar to those of the first indicator 27, and are not redundantly described herein.

In this embodiment, the second switch 359 is electrically connected with the cathode of the coupler diode D of the optical coupler P and the ground terminal. In case that the input power $V_{in}$ is normally received and the microprocessor 36 is in the pairing mode, the second switch 359 is turned on by pressing the second button 358. Meanwhile, the operation voltage Vcc is transmitted to the coupler diode D through the second resistor $R_6$ so as to turn on the coupler transistor $T_f$. Since the current output terminal 357 of the coupler transistor $T_f$ is electrically connected with the ground terminal, the voltage at the current input terminal 356 of the coupler transistor $T_f$ is pulled down. Meanwhile, a pairing signal Sp with the low voltage level is transmitted from the current input terminal 356 of the coupler transistor $T_f$ to the microprocessor 36. Consequently, the microprocessor 36 performs the pairing process.

In the above embodiments, the electrically operated device to be controlled by the control system 1 is an electric bed. It is noted that the electrically operated device is not restricted to the electric bed. For example, in some other embodiments, the electrically operated device is an electric window curtain. Moreover, the power source for providing the input power $V_{in}$ is not restricted to the utility power source. For example, the power source is a solar power source. In case that the input power $V_{in}$ from the solar power source is normally received, the operations are similar to those of the control system 1. The input power $V_{in}$ is transmitted to the first transmission terminal 21 and the first switch 25 through the path selection circuit 26 of the first control box 2. After the input power $V_{in}$ from the first transmission terminal 21 is transmitted to the first receiving terminal 31 of the second control box 3, the input power $V_{in}$ is received by the voltage divider 34 and subjected to a voltage division. Consequently, a divided voltage $V_d$ with a first voltage level is generated by the voltage divider 34 and provided to the microprocessor 36. Under this circumstance, the microprocessor 36 is in the pairing mode. In the pairing mode, the microprocessor 36 detects whether the pairing signal Sp from the pairing circuit 35 is received. In the paring mode, if the first button 24 of the first control box 2 is pressed by the user, the first switch 25 is turned on. Consequently, the input power $V_{in}$ is transmitted to the second receiving terminal 32 of the second control box 3 through the path selection circuit 26, the first switch 25 and the second transmission terminal 22. After the input power $V_{in}$ is received by the pairing circuit 35, the pairing circuit 35 generates the pairing signal Sp. In response to the pairing signal Sp, the microprocessor 36 performs the pairing process. By pressing a pairing button of a remote controller (not shown), the pairing between the remote controller and the microprocessor 36 is established. Consequently, the user can operate the remote controller to have the second control box control the electric window curtain. For example, if the intensity of the solar light is high, the user may operate the remote controller to partially close the electric window curtain in order to enhance the light-obscuring efficacy.

Whereas, if the intensity of the solar light is very weak and thus input power $V_{in}$ is interrupted, the user may press the first button 24 of the first control box 24 to turn on the first switch 25. Consequently, the backup power $V_b$ of the electric storage device 23 is transmitted to the first receiving terminal 31 through the path selection circuit 26, the first switch 25, the second transmission terminal 22, the second receiving terminal 32 and the first diode 33. After the backup power $V_b$ is received by the voltage divider 34 through the first receiving terminal 31 and subjected to a voltage division, a divided voltage $V_d$ with a second voltage level is generated by the voltage divider 34. After the divided voltage $V_d$ with the second voltage level is received by the microprocessor 36, the microprocessor 36 is in the emergency mode. In the emergency mode, the backup power $V_b$ from the electric storage device 23 is used by the second control box 3. Consequently, the electrically operated device is restored to a default state from the current state. For example, the electric window curtain is opened to a predetermined position, and thus the solar light is not obstructed by the electric window curtain.

From the above descriptions, the present invention provides a control system and a control method for an electrically operated device. In case that the input power is normally received, the microprocessor receives the divided voltage with the first voltage level from the voltage divider, so that the microprocessor is in the pairing mode. If the second control box is in the pairing mode and the first switch is turned on by pressing the first button, the microprocessor receives the pairing signal from the pairing circuit, so that the microprocessor performs the pairing process. In case that the input power is interrupted and the first switch is turned on by pressing the first button, the microprocessor receives the divided voltage with the second voltage level from the voltage divider, so that the microprocessor is in the emergency mode. In other words, even if the first control box is equipped with a single button, the microprocessor of the second control box can be selectively in the pairing mode or the emergency mode. Consequently, the control system of the present invention is cost-effective. In the pairing mode, the microprocessor issues a low level signal to the first indicator, so that the first indicator is in a first indication state. After the paring signal is received by the microprocessor, the microprocessor issues a high level signal to the first indicator, so that the first indicator is in a second indication state. After the pairing process is completed, the microprocessor issues a periodic pulse signal to the first indicator, so that the first indicator is in a third indication state. In other words, even if the first control box is equipped with a single indicator, the indicator can show the power status of the first control box and the pairing situation of the second control box. Consequently, the control system of the present invention is more cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control system for controlling an electrically operated device, the control system comprising:
    a first control box comprising:
        a first transmission terminal;
        a second transmission terminal;
        a controllable switching unit, connected to the second transmission terminal, and selectively turned on or turned off;
        an electric storage device configured to store a backup power; and
        a path selection circuit configured to receive an input power, and electrical connected to the first transmission terminal, the controllable switching unit and the electric storage device, wherein when the input power is available, the input power is transmitted to the first transmission terminal and the controllable switching unit through the path selection circuit, wherein when the input power is not available, the backup power is transmitted to the controllable switching unit through the path selection circuit; and
    a second control box controlled by the first control box to control the electrically operated device accordingly, wherein the second control box comprises a main controlling unit electrically connected with the first transmission terminal and the second transmission terminal, wherein when the input power is available, the main controlling unit receives the input power through the first transmission terminal and the second control box is operated in a pairing mode,
    wherein when the second control box is operated in the pairing mode and the controllable switching unit is turned on, the input power is transmitted to the main controlling unit through the controllable switching unit and the second transmission terminal, and the main controlling unit performs a pairing process,
    wherein when the input power is not available and the controllable switching unit is turned on, the backup power is transmitted to the main controlling unit through the controllable switching unit and the second transmission terminal, and the second control box is operated in an emergency mode
    wherein the controllable switching unit comprises:
        a first button configured to be pressed by a user; and
        a first switch electrically connected between the path selection circuit and the second transmission terminal, wherein when the first button is pressed, the first switch is turned on, wherein when the first button is not pressed, the first switch is turned off.

2. The control system according to claim 1, wherein the main controlling unit of the second control box comprises:
    a first receiving terminal electrically connected with the first transmission terminal;
    a second receiving terminal electrically connected with the second transmission terminal;
    a first diode electrically connected between the second receiving terminal and the first receiving terminal, wherein when the input power is not available and the first button is pressed, the backup power is transmitted from the electric storage device to the first receiving terminal through the path selection circuit, the first switch, the second transmission terminal, the second receiving terminal and the first diode;

a voltage divider electrically connected with the first receiving terminal, wherein when the second control box is operated in the pairing mode, the voltage divider generates a divided voltage with a first voltage level, wherein when second control box is operated in the emergency mode and the first button is pressed, the voltage divider generates the divided voltage with a second voltage level;

a pairing circuit electrically connected with the second receiving terminal to receive the input power through the path selection circuit, the first switch, the second transmission terminal and the second receiving terminal, wherein when the input power is available and the first button is pressed, the pairing circuit generates a pairing signal; and a microprocessor electrically connected with the voltage divider and the pairing circuit, wherein when receiving the divided voltage with the first voltage level, the microprocessor controls the second control to be operated in the pairing mode, wherein when receiving the pairing signal and the second control box being operated in the pairing mode, the microprocessor performs the pairing process;

wherein when receiving the divided voltage with the second voltage level, the microprocessor controls the second control box to be operated in the emergency mode.

3. The control system according to claim 2, wherein the second control box further comprises a conversion circuit electrically connected with the first receiving terminal of the second control box, wherein the input power or the backup power from the first receiving terminal is converted into an operation voltage by the conversion circuit.

4. The control system according to claim 3, wherein the voltage divider comprises a first divider resistor and a second divider resistor, and the pairing circuit comprises:

a third divider resistor, wherein a first terminal of the third divider resistor is electrically connected with the second receiving terminal;

a fourth divider resistor, wherein a first terminal of the fourth divider resistor is electrically connected with a second terminal of the third divider resistor, and a second terminal of the fourth divider resistor is electrically connected with a ground terminal;

a first transistor, wherein a first control terminal of the first transistor is electrically connected with the second terminal of the third divider resistor and the first terminal of the fourth divider resistor, and a first current output terminal of the first transistor is electrically connected with the ground terminal;

a first resistor, wherein a first terminal of the first resistor receives the operation voltage, and a second terminal of the first resistor is electrically connected with the microprocessor;

a second resistor, wherein a first terminal of the second resistor receives the operation voltage; and an optical coupler comprising a coupler diode and a coupler transistor, wherein a cathode of the coupler diode is electrically connected with a first current input terminal of the first transistor, an anode of the coupler diode is electrically connected with a second terminal of the second resistor, a current input terminal of the coupler transistor is electrically connected with the second terminal of the first resistor and the microprocessor, and a current output terminal of the coupler transistor is electrically connected with the ground terminal, wherein when the main controlling unit performs the pairing process, the input power from the second receiving terminal is subjected to a voltage division by the third divider resistor and the fourth divider resistor, so that the first transistor is turned on, wherein when the first transistor is turned on, the operation voltage is transmitted to the coupler diode through the second resistor, so that the coupler transistor is turned on and the pairing signal with a low voltage level is transmitted from the coupler transistor to the microprocessor.

5. The control system according to claim 4, wherein the second control box further comprises:

a second button configured to be pressed by a user; and a second switch electrically connected between the cathode of the coupler diode and the ground terminal, wherein when the input power is received and the second button is pressed, the second switch is turned on, wherein when the second switch is turned on, the operation voltage is transmitted to the coupler diode through the second resistor, so that the coupler transistor is turned on and the pairing signal with the low voltage level is transmitted from the coupler transistor to the microprocessor.

6. The control system according to claim 2, wherein the first control box further comprises a first indicator electrically connected with the microprocessor, wherein when the second control box is operated in the pairing mode, the microprocessor issues a low level signal to the first indicator, so that the first indicator is in a first indication state.

7. The control system according to claim 6, wherein after receiving the paring signal, the microprocessor issues a high level signal to the first indicator, so that the first indicator is in a second indication state.

8. The control system according to claim 6, wherein after the paring signal is received by the microprocessor and the pairing process is completed, the microprocessor issues a periodic pulse signal to the first indicator, so that the first indicator is in a third indication state.

9. The control system according to claim 8, wherein the first indicator comprises:

a third resistor, wherein a first terminal of the third resistor is electrically connected with the microprocessor;

a second transistor, wherein a second control terminal of the second transistor is electrically connected with a second terminal of the third resistor, and a second current output terminal of the second transistor is electrically connected with a ground terminal;

a fourth resistor, wherein a first terminal of the fourth resistor is electrically connected with a second current input terminal of the second transistor, and a second terminal of the fourth resistor receives the input power;

a fifth resistor, wherein a first terminal of the fifth resistor is electrically connected with the first terminal of the fourth resistor and the second current input terminal of the second transistor;

a third transistor, wherein a third control terminal of the third transistor is electrically connected with a second terminal of the fifth resistor, and a third current input terminal of the third transistor receives the input power;

a first light emitting diode, wherein an anode of the first light emitting diode is electrically connected with a third current output terminal of the third transistor; and a sixth resistor, wherein a first terminal of the sixth resistor is electrically connected with a cathode of the first light emitting diode, and a second terminal of the sixth resistor is electrically connected with the ground terminal.

10. The control system according to claim 6, wherein the second control box further comprises a second indicator electrically connected with the microprocessor and the first indicator, wherein a circuitry configuration of the second indicator is identical to that of the first indicator, wherein the second indicator is in a first indication state, a second indication state or a third indication state in response to a low level signal, a high level signal or a periodic pulse signal from the microprocessor, respectively, wherein the first indicator and the second indicator are in synchronization with each other.

11. The control system according to claim 2, wherein the path selection circuit comprises a second diode and a third diode, wherein an anode of the second diode receives the input power, a cathode of the second diode is electrically connected with the first switch, an anode of the third diode is electrically connected with the electric storage device, and a cathode of the third diode is electrically connected with the first switch and the cathode of the second diode.

12. The control system according to claim 1, wherein when the second control box is operated in the emergency mode, the electrically operated device is switched to a default state by the main controlling unit.

13. The control system according to claim 12, wherein the electrically operated device is an electric bed, wherein when the second control box is operated in the emergency mode, the electric bed is adjusted to be in a flat state.

14. A control method for controlling an electrically operated device by a control system, wherein the control system comprises a first control box and a second control box, wherein the first control box comprises a first transmission terminal, a second transmission terminal, an electric storage device, a controllable switching unit and a path selection circuit, the controllable switching unit is electrically connected with the second transmission terminal, and the path selection circuit is electrically connected with the first transmission terminal, the controllable switching unit and the electric storage device, wherein the second control box is controlled by the first control box and the electrically operated device is correspondingly controlled by the second control box, wherein the second control box comprises a main controlling unit electrically connected with the first transmission terminal and the second transmission terminal, wherein the controllable switching unit comprises: a first button configured to be pressed by a user; and a first switch electrically connected between the path selection circuit and the second transmission terminal, wherein when the first button is pressed, the first switch is turned on, wherein when the first button is not pressed, the first switch is turned off, the control method comprising the steps of:

(a) determining Whether an input power is normally received by the path selection circuit;

(a1) when the input power is normally received by, the path selection circuit, the control system performs the following steps of:

(a11) transmitting the input power to the main controlling unit through the path selection circuit and the first transmission terminal;

(a12) allowing the main controlling unit to be operated in a pairing mode according to the input power from the first transmission terminal; and (a13) when the controllable switching unit is turned on, the input power is transmitted to the main controlling unit through the path selection circuit, the controllable switching unit and the second transmission terminal, so that the main controlling unit performs a pairing process; and (a2) when the input power is interrupted, the control system performs the following steps of:

(a21) when the controllable switching unit is turned on, a backup power of the electric storage device is transmitted to the main controlling unit through the path selection circuit, the controllable switching unit and the second transmission terminal; and (a22) allowing the main controlling unit to be operated in an emergency mode according to the backup power from the second transmission terminal.

15. The control method according to claim 14, wherein the first control box further comprises a first indicator electrically connected with the main controlling unit, wherein in the step (a12), when the main controlling unit is operated in the paring mode, the main controlling unit issues a low level signal to the first indicator, so that the first indicator is in a first indication state.

16. The control method according to claim 15, wherein in the step (a13), when the main controlling unit performs the paring process, the main controlling unit issues a high level signal to the first indicator, so that the first indicator is in a second indication state.

17. The control method according to claim 15, wherein in the step (a13), when the main controlling unit performs the paring process and the pairing between a remote controller and a microprocessor of the second control box is established, the main controlling unit issues a periodic pulse signal to the first indicator, so that the first indicator is in a third indication state.

* * * * *